Aug. 5, 1969  J. A. MAS  3,460,019
BATTERY CHARGING SYSTEM AND TRANSDUCER THEREFOR
Filed Sept. 30, 1966
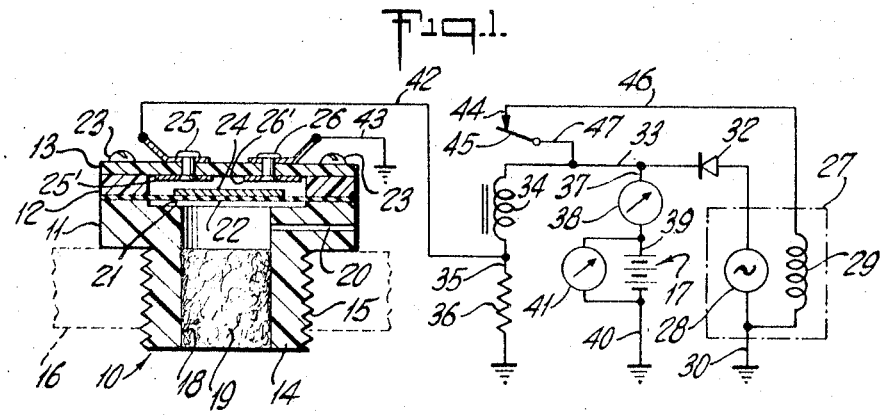
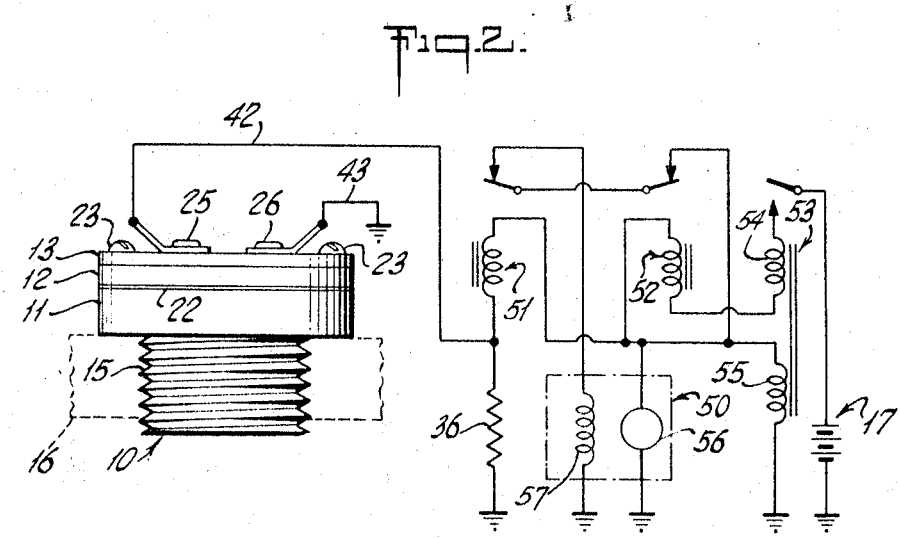
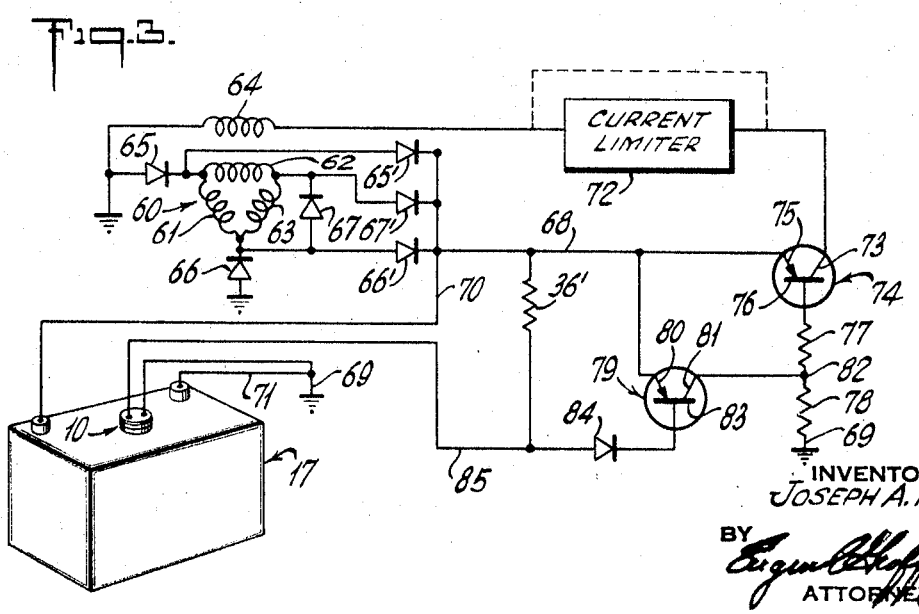
INVENTOR
JOSEPH A. MAS
BY
ATTORNEY United States Patent Office 3,460,019
Patented Aug. 5, 1969

3,460,019
BATTERY CHARGING SYSTEM AND TRANSDUCER THEREFOR
Joseph A. Mas, Woodbury, N.Y., assignor to Dynamic Instrument Corp., Plainview, N.Y., a corporation of New York
Filed Sept. 30, 1966, Ser. No. 583,274
Int. Cl. H02j 7/04, 7/16; H02p 13/00
U.S. Cl. 320—31                                            9 Claims

ABSTRACT OF THE DISCLOSURE

A pressure transducer for producing a change in resistance in response to battery pressure using metal and carbon contacts and a voltage regulating system responsive to battery pressure to control the charging voltage applied to the battery.

---

This invention relates to battery charging systems and more specifically to an improved system and pressure transducer for charging batteries and which affords means for determining the state of charge of a battery.

One object of the invention resides in the provision of a novel and improved battery charging system including an improved pressure transducer for batteries that affords improved charging efficiency in conversion of electrical energy to chemical energy and at the same time reduces the charging time and prevents damage through overcharging.

Still another object of the invention resides in the provision of a novel and improved pressure transducer for sensing the pressure in a battery and producing a corresponding change in an electrical characteristic for controlling the charging rate of the battery.

A still further object of the invention resides in the provision of a novel and improved charging system for charging batteries that may be used to provide an indication of the state of charge of the battery under charge.

The above and other objects and advantages of the invention will become more apparent from the following description and accompanying drawings forming part of this application.

In the drawings:

FIGURE 1 is a cross sectional view of a pressure transducer interconnected with a power supply and a voltage regulator to control the rate of charge of a battery.

FIGURE 2 is a circuit diagram of another form of power supply and regulator for charging batteries which is controlled by the pressure transducer as illustrated in FIGURE 1.

FIGURE 3 is a circuit diagram of still another charging regulator for batteries controlled by a pressure transducer as illustrated in FIGURE 1.

Broadly, the invention contemplates an improved system for charging batteries and includes an improved pressure transducer which is coupled to the battery and responds to the pressure generated within the battery to control the charging rate. In this way it has been found that batteries can be charged more efficiently, quickly and without the danger of damage resulting from too high a charging rate or overcharging. The charging system and the improved transducer now to be described are useful for charging all types of batteries both stationary and vehicular though for convenience in the instant description reference will be made specifically to systems useful in automotive and other vehicles.

Referring now to FIGURE 1, the transducer in accordance with the invention is generally denoted by the numeral 10 and comprises a housing of insulating material and formed of a bottom portion 11, a ring 12 and a cover 13. The bottom housing portion 11 is essentially annular in shape and has a downwardly extending tubular member 14 with external threads 15 for threadably engaging an opening in a cell 16 of a battery to be charged. The cell 16 may comprise one of the cells of the storage battery diagrammatically illustrated and denoted by the numeral 17. If desired, in the case of multi-cell batteries, the cells may be coupled by a manifold or otherwise interconnected so that a single transducer 10 can be utilized to sense the average pressure developed by all of the cells during the charging operation.

The central opening 18 in the threaded portion 14 of housing 11 is filled with loosely packed glass wool 19 or other similar material to prevent the electrolyte from splashing into the opening 18. This is particularly important in connection with batteries utilized in motor vehicles. The housing 11 may also have a very fine orifice 20 extending from the outer surface of the housing portion 11 to the inner opening 18. If desired, a larger orifice may be used and filled with a very fine porous material. The orifice is utilized to relieve slowly the pressure built up within the battery cell. Since the rate of pressure release from the orifice 20 is very much slower than the rate at which the pressure is generated within the cell during charging, the orifice 20 does not interfere with the normal control of the charging rate in accordance with pressure variations. Should the pressure become excessively high for any reason, the rate of release of pressure through the orifice 20 will automatically increase.

The housing portion 11 has an annular recess 21 substantially greater in diameter than the opening 18. A diaphragm 22 of any suitable flexible acid resisting material overlies the top of the housing portion 11 and is secured in place by the ring 12 and cover 13, the latter being secured to the housing by a plurality of screws 23.

The diaphragm 22 carries a carbon disc 24 which is cemented or otherwise suitably fastened to the diaphragm. The cover 13 includes a pair of terminals 25 and 26, each having contacts 25' and 26', respectively, on the inside of the cover and immediately above the carbon disc.

With the transducer as above described, the resistance between the terminals 25 and 26 will be substantially infinite. As pressure develops within the battery cell 16, it will deflect the diaphragm 22 upwardly causing the carbon disc 24 to engage the contacts 25' and 26' producing a relatively high resistance between the terminals 25 and 26. As the pressure increases and the carbon disc 24 is urged more firmly against the contacts 25' and 26', the resistance between the terminals 25 and 26 will gradually decrease to a very low value approximately the actual resistance of that portion of the carbon disc between the contacts 25' and 26'.

Inasmuch as the pressure transducer is useful, among other things, for automotive storage batteries, FIGURE 1 illustrates a simplified circuit diagram of an automotive charging system and regulator utilizing as the power generating means an alternator 27 consisting of an armature 28 and a field coil 29. One side of the armature and field coil are connected to ground via a lead 30. The other side of the armature 28 is connected by a lead 31 through a rectifier 32 and thence through a lead 33 to a voltage regulating coil 34. The bottom side of the coil 34 is connected by a lead 35 through a resistor 36 to ground. The lead 33 is also connected via lead 37, an ammeter 38, and lead 39 to the battery 17 which in turn is connected via lead 40 to ground. If desired, a voltmeter 41 may be connected between the leads 39 and 40 to measure the battery voltage. The terminals 25 and 26 of the transducer 10 previously described are connected across the resistor 36 by means of a lead 42 connecting the terminal 25 to the lead 35 and a lead 43 connecting the terminal 26 to ground. The normally closed contacts 44 and 45 controlled by the regulating coil 34 are connected respectively through leads 46 and 47 to the top side of the field coil 29 and the lead 43.

With the circuit as described above, as the armature 28 is rotated by the automotive engine, voltage will be developed which is then rectified by the rectifier 32 and fed to the battery and through the coil 34 and the resistor 36 to ground. Since there will be substantially zero pressure in the cell 16 of battery 17, the carbon disc 24 will be in position substantially as illustrated in the figure so that maximum resistance will occur between the coil 34 and ground. This will permit the voltage to rise to a maximum value. This high voltage will cause a correspondingly high current to pass through the battery to charge it. The charging process liberates gas from the electrolyte, and since the cells of the battery being charged are all preferably sealed and interconnected, the transducer 10 will respond to an average pressure of all the cells. The cells will develop a sufficient pressure to deflect the diaphragm 22 and cause the carbon disc 24 to engage the contracts 25' and 26', thus decreasing the resistance between the regulating coil 34 and ground. This action lowers the voltage at which the regulating coil 34 will operate to cause the contacts 44 and 45 to perform their regulating function. As the pressure of the gas in the battery being charged decreases, the resistance of the transducer will increase causing the contacts 44 and 45 to develop a higher charging voltage. By properly correlating the characteristics of the coil 34, the resistor 36 and the sensitivity of the diaphragm 22, any gas pressure can be maintained in the battery during the charging operation. It also follows that with a diaphragm 22 and coil 34 having preselected characteristics, the resistor 36 can be made variable for the purpose of setting a maximum charging voltage for the system.

A charging system utilizing the basic functions as described in connection with FIGURE 1 may also be utilized to determine the state of charge of a battery. For this purpose the ammeter 38 is connected in series with the battery 17. If desired, a voltmeter 41 may also be connected across the battery. It has been found that the state of charge of a battery is reflected in the value of the current required to maintain a given gas pressure in the battery when being charged. Thus the ammeter 38 can be directly calibrated in terms of the state of charge of a given type of battery such as a lead acid cell or the like and then by merely placing the battery in the charging system and passing a current through a battery to charge it until the gas pressure has stabilized, the meter 38 will automatically indicate the amount of charge remaining in the battery.

While the circuit of FIGURE 1 illustrates one type of voltage supply for charging batteries, it is evident that other types of power supplies wherein the voltage is controlled by the transducer 10 could be utilized for stationary applications. This aspect of the invention is particularly important in connection with the nickel cadmium battery. At the present time nickel cadmium batteries that have been used are completely discharged and are then recharged at a predetermined rate for a selected time. This is necessary since neither the voltage nor the specific gravity of the electrolyte can be used to determine the charge remaining in the battery. However, with the present invention it is possible to provide a nickel cadmium battery with a pressure transducer such as the transducer 10 and then by passing a current through the battery to produce a given gas pressure the charge remaining in the battery will be known. Knowing the state of charge of the nickel cadmium cell, it can be brought to full charge without first discharging it.

The transducer 10 as described in connection with FIGURE 1 may also be utilized with a DC generator 50 and its associated regulating system as illustrated in FIGURE 2. In this figure the transducer 10 may be identical to the transducer described in FIGURE 1. The regulating system varies from that shown in FIGURE 1 in that it includes a voltage control device 51, a current control relay 52, and a cutout relay 53 having a current coil 54 and a voltage coil 55. As in the case of the circuit of FIGURE 1, the coil of the voltage control 51 is connected to ground through resistor 36 which corresponds to the resistor 36 of FIGURE 1. The terminals 25 and 26 of the transducer 10 are connected in parallel with the resistor 36 by leads 42 and 43. Inasmuch as the circuit shown in FIGURE 2, with the exception of the utilization of resistor 36, is well known, a detailed description is not deemed necessary. In operation the armature 56 of the generator 50 is rotated by the gasoline engine and the residual magnetism in field 57 will cause the production of a DC voltage. This voltage energizes coil 55 of relay 53 to close the associated contacts. This produces a current through the coils 52 and 54, the latter holding the relay 53 in a closed position. The coil 52 is adjusted to open its associated contacts should the current exceed a given value. The magnitude of the current is controlled by the voltage applied to the field coil 57 of the generator, and this is in turn controlled by the voltage control 51. When sufficient voltage is applied to the control 51, it will function to regulate the flow of current through the field 57. The resistor 36 in series with the voltage control 51 lowers the voltage at which the control will operate to adjust the current to the field 57. As in the case of the circuit shown in FIGURE 1, the transducer 10 is connected in parallel with the resistor 36 so that as the gas pressure increases in the battery 17, of which the cell 16 is a part, gas pressure will reduce the resistance between the contacts 25' and 26' and thus lower the voltage at which the control 51 functions. Thus, as in the case of the circuit shown in FIGURE 1, the battery 17 is caused to maintain a substantially uniform gas pressure throughout the charging cycle which automatically compensates for changes in battery temperature and increases the efficiency of the charging operation and reduces the time required to bring the battery to full charge.

A further modification of the invention is illustrated in FIGURE 3 which uses the transducer 10 to control a three-phase alternator and transistorized voltage regulator. For present purposes it may be assumed that the battery 17 illustrated in this figure is a 12 volt battery having intercommunication between the cells so that the transducer 10 senses the average gas pressure developed in all of the cells of the battery. The alternator 60 includes a delta-connected stator having windings 61, 62 and 63 and an armature containing a single phase, field winding 64. As the field is rotated by an automotive engine or other prime mover, a three-phase voltage will be generated in the stator windings. A group of six rectifiers 65 to 67 and 65' to 67' are connected to provide full-wave rectification of the stator voltage, and the rectified voltage appears between the conductor 68 and ground 69.

The output of the generator 60 is fed via the lead 70 to the positive terminal of the battery 17, and the negative terminal of the battery 17 is connected by a lead 71 to the ground 69. The field coil 64 has one side connected to the ground and the other side may be connected via a current limiting device 72 to the collector 73 of a transistor 74. The emitter 75 of the transistor 74 controls the current to the field 64 of the generator and in turn controls the output voltage. The base 76 of transistor 74 is connected through two series-connected resistors 77 and 78 to the ground. The values of the resistors 77 and 78 are selected so that when the generator is operated, sufficient current will flow through the transistor 74 to saturate the field 64 and produce maximum output voltage from the generator.

The generator voltage is controlled by the cooperation of a second transistor 79 with the transistor 74. The transistor 79 has an emitter 80 connected to the lead 68 and a collector 81 connected to the junction 82 between the resistors 77 and 78. The base 83 is connected through a reference voltage diode 84 and through the pressure responsive impedance device or transducer 10 to the ground 69. A resistor 36' which corresponds in function to resistor 36 of FIGURES 1 and 2, is connected between the lead 68 and the lead 85, the latter connecting the voltage reference diode 84 to the pressure responsive transducer 10.

With the foregoing circuit, if the battery 17 has been idle, then at the time the generator 60 is started, there will be zero gas pressure within the battery, and the impedance of the transducer 10 will be at a maximum. Since the transducer 10 and the resistor 36' form a voltage divider, a positive voltage will appear on the lead 85. Assuming that the battery 17 is a 12-volt battery and that the reference diode 84 produces a 12.8 volt reference, then when the impedance 10 is at a maximum, the transistor 79 will be opened and permit the transistor 74 to remain closed to produce maximum voltage from the generator. This maximum voltage produces a maximum charge on the battery which continues until gas pressure develops within the battery. At this point, the impedance of the transducer 10 starts to decrease and will reach a low impedance value at a preselected maximum battery pressure. The transistor 79 then conducts heavily placing the junction 82 at substantially the same potential as the lead 68, turning off the transistor 74 and substantially interrupting the current to the field 64. In normal operation of the device, however, when gas pressure develops within the battery, the charging rate is gradually reduced until a predetermined balance is attained between gas pressure and charging current, whereby the charge continues at a constant battery gas pressure.

While only certain embodiments of the invention have been illustrated and described, it is apparent that alterations, changes and modifications may be made without departing from the true scope and spirit thereof as defined by the appended claims.

What is claimed is:

1. In combination, a pressure transducer for use in charging a battery comprising a diaphragm, means for supporting said diaphragm and coupling one side thereof to a battery to cause the diaphragm to deflect outwardly in response to battery pressure, pressure variable resistance means coupled with said diaphragm and including at least two conductive elements movable into pressure contact one with the other in response to battery pressure to modify said resistance, and a battery charger including a direct current power source, means for modifying the average voltage of said source, means connecting said source to said battery and connections between the resistive means of said transducer and said voltage modifying means whereby said transducer will adjust said voltage to maintain a selected gas pressure in said battery, said voltage modifying means comprising a regulator having a coil and contacts controlled thereby, a connection between one side of said coil and one side of said source, a resistor connecting the other side of said coil to the other side of said source, and connections between said contacts and said source to at least partially reduce the voltage of said source when the contacts are operated wherein said transducer connections connect said transducer in parallel with said resistor.

2. In combination, a pressure transducer for use in charging a battery comprising a diaphragm, means for supporting said diaphragm and coupling one side thereof to a battery to cause the diaphragm to deflect outwardly in response to battery pressure, pressure variable resistance means coupled with said diaphragm and including at least two conductive elements movable into pressure contact one with the other in response to battery pressure to modify said resistance, and a battery charger including a direct current power source, means for modifying the average voltage of said source, means connecting said source to said battery and connections between the resistive means of said transducer and said voltage modifying means whereby said transducer will adjust said voltage to maintain a selected gas pressure in said battery, said direct current source comprising a generator having a voltage generating winding, a field winding and a rectifier connected with one side of said voltage generating winding to produce direct current to charge the battery, wherein said voltage modifying means comprises a regulator having a coil and normally closed contacts, a connection between one side of said coil and said rectifier, a resistor connecting the other side of said source to the other side of said voltage winding, leads connecting said contacts, said field winding and said battery in series to energize the field when the contacts are closed and wherein said transducer connections connect said transducer in parallel with said resistor.

3. In combination, a pressure transducer for use in charging a battery comprising a diaphragm, means for supporting said diaphragm and coupling one side thereof to a battery to cause the diaphragm to deflect outwardly in response to battery pressure, pressure variable resistance means coupled with said diaphragm and including at least two conductive elements movable into pressure contact one with the other in response to battery pressure to modify said resistance, and a battery charger including a direct current power source, means for modifying the average voltage of said source, means connecting said source to said battery and connections between the resistive means of said transducer and said voltage modifying means whereby said transducer will adjust said voltage to maintain a selected gas pressure in said battery, said direct current source comprising a direct current generator having an armature and a field and means for connecting said armature to the battery to be charged, wherein said voltage modifying means comprises a regulator having a coil and normally closed contacts, a connection between one side of said coil and one side of said armature, a resistor connecting the other side of said coil to the other side of said armature, leads connecting said contacts, said field winding and said armature in series to energize the field when the contacts are closed and wherein said transducer connections connect said transducer in parallel with said resistor.

4. A pressure transducer for use in charging a battery comprising a diaphragm, means supporting said diaphragm and coupling one side thereof to a battery to cause the diaphragm to deflect outwardly in response to battery pressure, and pressure variable resistive means coupled to said diaphragm and including at least two spaced contacting elements one of which being carbon and the other metal whereby pressure in said battery will deflect said diaphragm to change the contact pressure between said elements and thereby modify the resistance therebetween in accordance with changes in battery pressure.

5. A pressure transducer according to claim 4 wherein said carbon contacting element is carried by said diaphragm and said metal contact element is fixed relative to said diaphragm supporting means.

6. A pressure transducer according to claim 4 wherein said carbon contacting element is carried by said diaphragm and said transducer includes two metal contacting elements spaced one from the other and fixed relative to said diaphragm supporting means whereby said carbon element in response to battery pressure engages said metal contacting elements and modifies the resistance between said metal elements.

7. A pressure transducer according to claim 4 wherein the first said coupling means includes a bleeder orifice to slowly relieve said battery pressure.

8. The combination with a pressure transducer according to claim 4 of a direct current power source means for modifying the voltage of said source, means for connecting said source to said battery being charged and connections between the elements of said transducer and said voltage modifying means whereby said transducer will adjust said voltage to limit the battery pressure to a predetermined maximum.

9. The combination according to claim 8 wherein said voltage modifying means includes a transistor control, means for producing a fixed reference voltage, means interconnected with said transducer for producing a sensing voltage variable in accordance with said battery pressure and connections between said control, said sensing voltage and said reference voltage whereby said control senses the difference between said sensing voltage and said reference voltage and modifies the charging voltage to maintain the difference voltage substantially at zero.

References Cited

UNITED STATES PATENTS

| | | | |
|---|---|---|---|
| 2,752,558 | 6/1956 | Kane | 73—398 X |
| 3,080,757 | 3/1963 | Johansson | 73—398 |
| 2,621,317 | 12/1952 | Ihrig | 320—46 X |
| 3,175,146 | 3/1965 | Rowe | 320—46 X |
| 3,252,071 | 5/1966 | Plessis | 320—46 |
| 3,281,640 | 10/1966 | Mas | 320—46 |

FOREIGN PATENTS 737,008   9/1955   Great Britain.

JOHN F. COUCH, Primary Examiner

STANLEY WEINBERG, Assistant Examiner

U.S. Cl. X.R.

73—398; 320—46, 52; 323—95; 338—42